(12) United States Patent
Bao et al.

(10) Patent No.: US 12,196,397 B2
(45) Date of Patent: Jan. 14, 2025

(54) ROTATING MOUNTING CLIP

(71) Applicant: ABL IP HOLDING LLC, Atlanta, GA (US)

(72) Inventors: Zhifeng Bao, ShaanXi (CN); Eden Dubuc, Montreal (CA)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 17/987,533

(22) Filed: Nov. 15, 2022

(65) Prior Publication Data

US 2024/0159382 A1 May 16, 2024

(51) Int. Cl.
*F21V 21/088* (2006.01)
*F16M 13/02* (2006.01)
*F21V 21/34* (2006.01)

(52) U.S. Cl.
CPC ......... *F21V 21/088* (2013.01); *F16M 13/022* (2013.01); *F21V 21/34* (2013.01); *F16M 13/027* (2013.01)

(58) Field of Classification Search
CPC ..... F21V 21/088; F21V 21/34; F16M 13/022; F16M 13/027
See application file for complete search history.

(56) References Cited

U.S. PATENT DOCUMENTS

| 9,777,908 | B1 | 10/2017 | Churnock | |
|---|---|---|---|---|
| 11,236,858 | B1 | 2/2022 | Rigby | |
| 2002/0071735 | A1 | 6/2002 | Dinh et al. | |
| 2003/0185643 | A1* | 10/2003 | Thompson | F16B 37/046 411/85 |

(Continued)

FOREIGN PATENT DOCUMENTS

| EP | 3916248 A1 * | 12/2021 | ............ F16B 37/046 |
|---|---|---|---|
| WO | 2020071609 A1 | 4/2020 | |
| WO | WO-2021250432 A1 * | 12/2021 | ............ F16B 37/045 |

OTHER PUBLICATIONS

Light Source Inc. Uni-Bolt online product page dated by web.archive.org at Sep. 28, 2020, https://www.thelightsource.com/products/uni-bolt-for-strut-channels-82 (Year: 2020).*

(Continued)

*Primary Examiner* — Eret C McNichols
*Assistant Examiner* — Ding Y Tan
(74) *Attorney, Agent, or Firm* — Kilpatrick Townsend & Stockton LLP

(57) ABSTRACT

A unitary mounting clip for mounting equipment to a building structure is disclosed. In an embodiment, the unitary mounting clip includes a base, a mounting structure rising from a top surface of the base, at least one elastic arm having a friction feature, and a snap holder extending from a bottom surface of the base. In some embodiments, the mounting structure includes a boss and a distal mounting tab, and the unitary mounting clip is attached to the building structure by inserting the boss and distal mounting tab through an opening of the building structure and then rotating the unitary mounting clip ninety degrees so that the friction feature of the at least one elastic arm is biased into contact with a wall portion of the building structure and locks the unitary mounting clip in place.

18 Claims, 8 Drawing Sheets

(56) References Cited

U.S. PATENT DOCUMENTS

2016/0138261 A1*  5/2016  Zhang .................. F16B 37/045
                                                    29/897.3
2018/0347614 A1* 12/2018  Reznar ................. F16B 37/046
2022/0128085 A1*  4/2022  Schaefer ............... F16B 37/045
2022/0252100 A1*  8/2022  Schaefer ............... F16B 37/045

OTHER PUBLICATIONS

Gualala Robotics Inc. light rail robotic grow light mover strut channel sold on amazon.com by first available date: Mar. 31, 2018, https://www.amazon.com/Introducing-Light-Rail-Compatible-Fasteners/dp/BO7BTT8GQ5 (Year: 2018).*

Rose Brand Uni-Bolt product page: web.archive.org dated to be Feb. 22, 2018, https://www.rosebrand.com/product2875/Light-Source-Uni-Bolt.aspx (Year: 2018).*

PCT/US2023/079629, "International Search Report and Written Opinion", Mar. 18, 2024, 7 pages.

* cited by examiner

ROTATING MOUNTING CLIP

FIELD OF THE INVENTION

The present disclosure generally relates to a unitary mounting clip that can be used to install equipment to a building structure. In some embodiments, the unitary mounting clip includes features for attachment to a strut channel and for installing light-emitting diode (LED) luminaires or LED batten lights thereto.

BACKGROUND

Light-emitting diode (LED) batten lights or LED luminaires are the new and modern equivalent of older-style fluorescent tube light fixtures. LED luminaires may be configured to hang from the ceiling and are typically designed to look stylish, and thus are popular for use in both commercial and residential settings, such as in offices, hospitals, parking garages, shopping centers, factories, warehouses, kitchens, home workshops and the like. In addition, LED battens are popular because the LED lighting devices contained within such LED luminaires save a considerable amount of energy as compared to fluorescent light fixtures and thus cost less money to utilize.

In some implementations, LED batten lights are affixed to a bracket or strut channel, such as the popular "Unistrut" which itself is attached to a ceiling or other fixture. Strut channels come in various sizes and shapes and include a channel or opening with side walls that that may be high-profile, low-profile or anywhere in-between. Strut channels are typically configured for accepting one or more strut channel nuts or other types of fasteners that are used to affix a luminaire or other object and/or device to the strut channel. In other implementations, LED batten lights may be connected to or affixed to other types of building structures, such as pipes, wires or cables, or from other types of elongated structures, and may be installed in many different orientations to emit light as required. For example, an LED batten can be installed vertically or horizontally or at an angle to the ceiling or to the floor of a building structure to emit light downwardly or upwardly or at any angle in between, as desired.

For example, in the horticulture field an array of LED batten lights must be positioned on strut channels in a manner that provides uniform lighting above the plants or crops to ensure even growth resulting in a high-quality yield of the plants or crops. Thus, when using a conventional strut channel nut assembly, in order to install and/or to adjust placement of one or more of the LED batten lights in an array of such lights the fastener(s) associated with a particular LED batten light must be loosened or removed, the luminaire position adjusted, and then the fastener re-tightened or re-installed, which is labor-intensive and thus costly.

Thus, the inventors recognized that it would be desirable to provide a unitary mounting clip that can be easily and quickly installed and/or repositioned without the use of any tools, which not only results in lowering installation costs but also provides flexibility for repositioning objects or devices, such as LED battens.

BRIEF SUMMARY OF THE INVENTION

Disclosed is a unitary a unitary mounting clip for mounting equipment to a building structure. In an embodiment, the unitary mounting clip includes a base, a mounting structure rising from a top surface of the base, at least one elastic arm having a friction feature, and a snap holder extending from a bottom surface of the base. In some embodiments, the mounting structure includes a boss and a distal mounting tab, and the unitary mounting clip is attached to the building structure by inserting the boss and distal mounting tab through an opening of the building structure and then rotating the unitary mounting clip ninety degrees so that the friction feature of the at least one elastic arm is biased into contact with a portion of the building structure and locks the unitary mounting clip in place.

In some implementations of the unitary mounting clip the at least one elastic arm extends from a top surface of the base, while in other implementations the at least one elastic arm extends from a bottom surface of the distal mounting tab. The unitary mounting clip may have a generally rectangular shape, and the friction feature may include a raised dimple structure located on a distal portion of the at least one elastic arm. Beneficially, in some implementations the boss of the unitary mounting clip has a generally circular shape and the distal mounting tab has generally rectangular shape such that the profile of the mounting structure is generally T-shaped. In addition, when the building structure comprises an elongated slot the unitary mounting clip may be installed by aligning a long side of the tab of the T-shaped structure with a longitudinal axis of the elongated slot of the building structure, inserting the T-shaped structure through the elongated slot at a desired position along the length of the building structure, and rotating the mounting clip ninety degrees to engage the friction feature into contact with a wall portion of the building structure.

In some embodiments, the unitary mounting clip further includes at least one wire channel provided through a side of the base of the unitary mounting clip and configured for attachment to a wire mount. Advantageously, in some implementations the unitary mounting clip also includes at least on wire mount receptacle formed in the top base surface adjacent the at least one wire channel.

In another aspect, a method for installing a unitary mounting clip to a building structure so that an object can then be installed thereto is disclosed. In an embodiment, a long side of a generally rectangular tab located on a distal end of a boss extending from a top surface of a unitary mounting clip is aligned with a longitudinal axis of an elongated slot of the building structure, then the tab is inserted through the elongated slot at a desired position along the length of the building structure, and next the unitary mounting clip is rotated ninety degrees to engage a friction feature into contact with a wall portion of the building structure.

In some implementations of the method, the friction feature is located on a top surface of a base of the unitary mounting clip below the generally rectangular tab, and when the mounting clip is rotated ninety degrees the friction feature engages with a bottom wall portion of the building structure. In an alternative implementation of the method, the friction feature is located on a bottom surface of the generally rectangular tab above a base of the unitary mounting clip, and when the mounting clip is rotated ninety degrees the friction feature engages with a top wall portion of the building structure. Some embodiments also beneficially include attaching an object to a snap holder located on a bottom surface of a base of the unitary mounting clip. In yet another implementation, the building structure comprises a strut channel and the bottom wall portion of the building structure comprises a top wall portion of a J-shaped flange of the strut channel and the top wall portion comprises a bottom wall portion of the J-shaped flange.

BRIEF DESCRIPTION OF THE DRAWINGS

Features and advantages of some embodiments, and the manner in which the same are accomplished, will become more readily apparent with reference to the following detailed description taken in conjunction with the accompanying drawings, which illustrate exemplary embodiments (not necessarily drawn to scale), wherein.

DETAILED DESCRIPTION

Figure 1A:
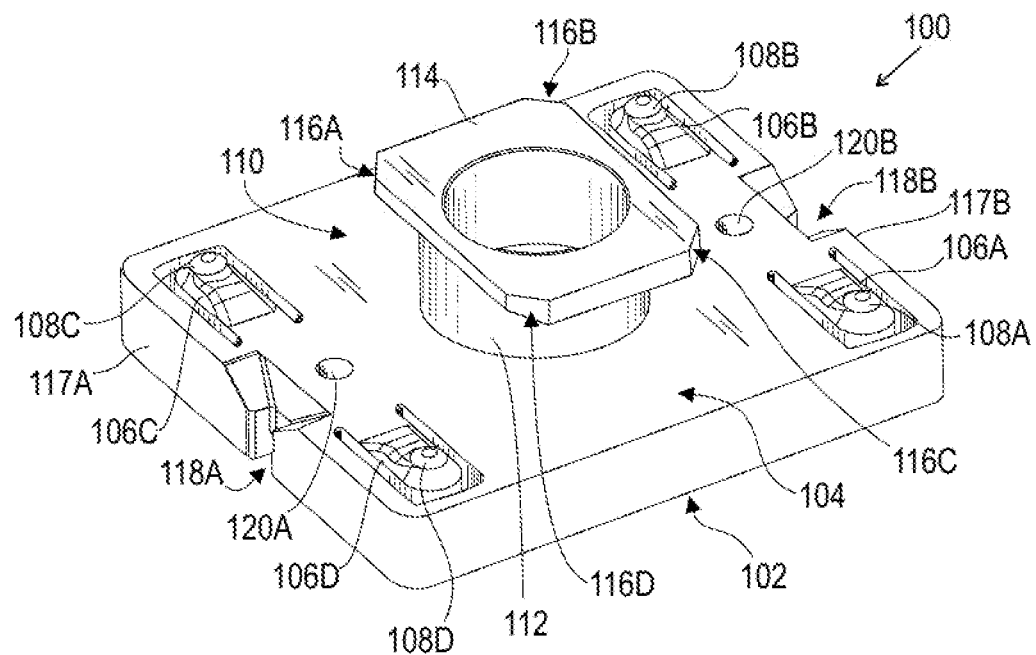
FIGS. 1A and 1B are a top perspective view and a bottom perspective view of a mounting clip in accordance with some embodiments of the disclosure.

Reference now will be made in detail to illustrative embodiments, one or more examples of which are illustrated in the drawings which may or may not be drawn to scale. Like components and/or items in the various drawings are identified by the same reference number, and each example is provided by way of explanation only and thus does not limit the invention. In fact, it will be apparent to those skilled in the art that various modifications and/or variations can be made without departing from the scope and/or spirit of the invention. For example, in many cases features illustrated or described as part of one embodiment can be used with another embodiment to yield a further embodiment. Thus, it is intended that the present disclosure covers such modifications and variations as come within the scope of the appended claims and their equivalents.

In general, and for the purpose of introducing concepts of embodiments of the present invention, a unitary mounting clip and methods for installation of same is described herein. Specifically, disclosed embodiments of the unitary mounting clip may first be mounted to a building structure, for example, a strut channel, pipe, wire or any elongated (or extruded) structure. Next, an object, such as an LED batten, may then be affixed thereto. In some embodiments, the mounting clip is a unitary mounting clip configured for installation by a user without the need to use any tools and without the need to use a separate fastener. In implementations, the unitary mounting clip may be connected to a strut channel by simply positioning the mounting clip within a channel (elongated slot) of the strut channel and turning it (or rotating it) a quarter-turn (¼ turn) or ninety-degrees (90°). Such a unitary mounting clip is then held in place by friction forces, but may be re-positioned by applying a force sufficient to slide it along the channel as will be explained in more detail below. Accordingly, disclosed embodiments of the unitary mounting clip facilitate the installation and/or positioning and/or re-positioning and/or replacement of LED lighting assemblies (such as linear LED luminaires) or other objects. In summary, embodiments of the unitary mounting clip are of unitary design, do not require any tools for installation or re-positioning, do not require fasteners to install, and advantageously improve the speed and ease of installation of luminaires or other objects which results in lower installation costs.

Figure 1B:
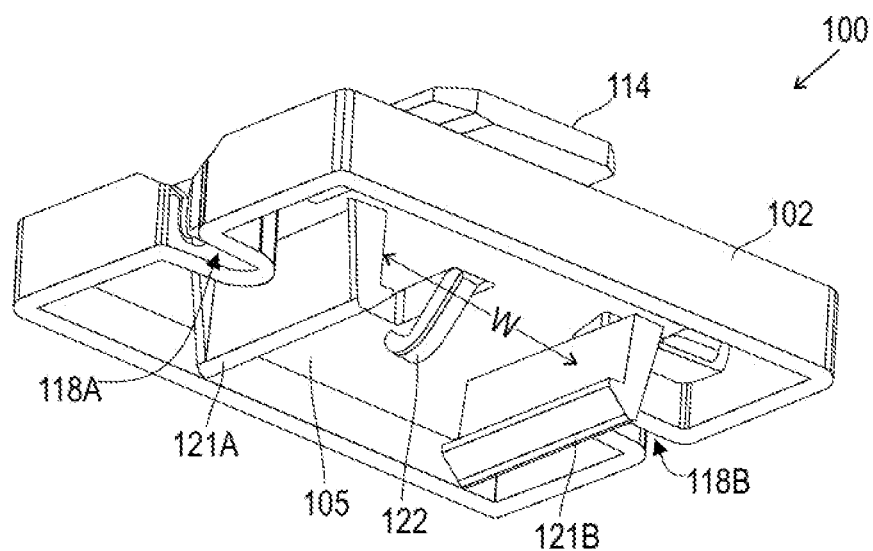

FIG. 1A is a top perspective view of a mounting clip 100, and FIG. 1B is a bottom perspective view of the same mounting clip 100 shown in FIG. 1A in accordance with an embodiment. The unitary mounting clip 100 may be a one-piece unit made of, for example, a polycarbonate material, a fiberglass material, plastic, metal and/or a composite material, any and all of which have sufficient strength to support an object to be connected thereto, such as an LED luminaire. In some implementations the mounting clip is manufactured using an injection molding process wherein a heated, liquid plastic is injected via a nozzle into a mold that includes the features of the mounting clip disclosed herein.

Referring again to FIG. 1A, in some embodiments the mounting clip 100 includes a generally rectangular base 102 having a top base surface 104. In the embodiment of FIGS. 1A and 1B, four elastic arms 106A, 106B, 106C and 106D are shown located near the corners or outside edges of the generally rectangular base 102. Each of the elastic arms 106A-106D includes a friction feature which in the illustrated embodiment is a raised dimple structure 108A, 108B, 108C and 108D, respectively, which function will be explained below. The elastic arms 106A-106D, which may also be thought of as flex levers, and their associated raised dimple structures 108A-108D project slightly upwards from the top base surface 104, as shown. The elastic arms 106A-106D or flex levers bias the raised dimple structures 108A-108D to contact a mounting component (not shown) and to apply pressure and/or a friction force which holds the mounting clip 100 in place which will be discussed in more detail below.

In the embodiment shown in FIGS. 1A and 1B, the mounting clip 100 also includes a central mounting structure 110 protruding from the top base surface 104 that is composed of a boss 112 and a tab 114. In some embodiments, the boss 112 has a generally circular base and the tab 114 has a generally rectangular shape. In some implementations, the tab 114 may include truncated corners 116A, 116B, 116C and 116D. As shown in FIG. 1A and in some of the following figures, in some embodiments when viewed in profile the mounting structure 110 including the boss 112 and the rectangular tab 114 is a generally "T-shaped" structure which is used for attachment to a strut channel (not shown), which mounting process will be explained in more detail below.

Referring again to FIG. 1A, in some embodiments the unitary mounting clip 100 includes a first wire channel 118A on a first side wall 117A of the base 102, and second wire channel 118B located on an opposite, second side wall 117B. The first wire channel 118A is associated with a first wire mount unit receptacle 120A whereas the second wire channel 118B is associated with a second wire mount receptacle 120B. The wire channels 118A, 118B and associated wire mount unit receptacles 120A, 120B are provided for implementations that include a wire mount unit (shown in FIG. 9) which can be attached to the mounting clip 100 during installation, which will be explained in more detail below.

FIG. 1B shows a bottom perspective view of the mounting clip 100 that includes a snap holder that includes a first snap holder portion 121A located opposite a second snap holder portion 121B. As shown, the first and second snap holder portions 121A, 121B extend downwards from a bottom base surface 105 of the unitary mounting clip. Also shown is a middle biasing member 122 that is hook-shaped or J-shaped and that protrudes downwardly from the bottom base surface 105, which function(s) will also be explained below. In the embodiment shown in FIG. 1B, the width "W" between the inner walls of the first snap holder 120A and the second snap holder 120B may be equal to the width of an LED luminaire that is to be installed thereto. But it should be understood that other types of snap holder embodiments are contemplated, for example, a snap holder embodiment wherein the width W is different (longer or shorter) in order to easily attach to a different object and/or other equipment, or for example a snap holder that includes outwardly facing snap holder portions (as opposed to the inwardly facing snap holder portions 121A, 121B shown in FIG. 1B) In addition, it should be understood that other types of quick-mounting snap holders could be used as known in the field.

Figure 2:
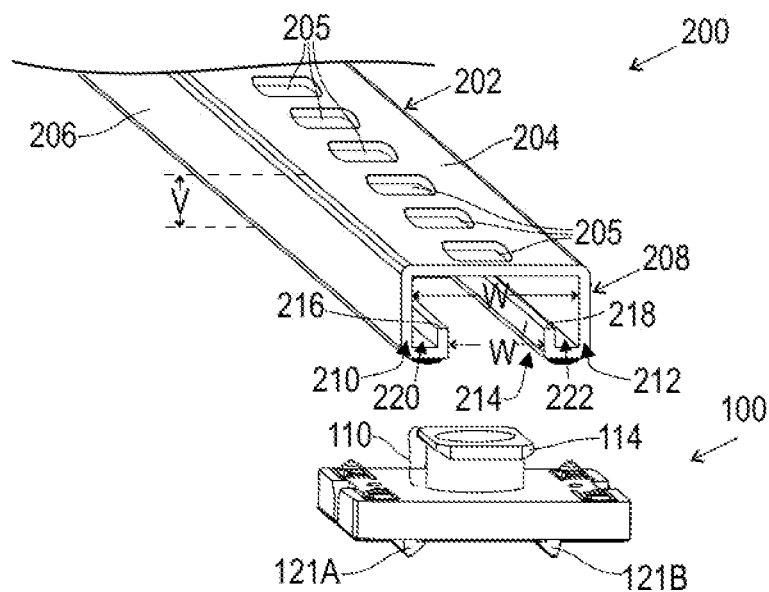
FIG. 2 is an exploded perspective view of a mounting clip and strut channel in accordance with some embodiments of the disclosure.

FIG. 2 is an exploded perspective view 200 of a strut channel 202, such as a "Unistrut," and a mounting clip 100 in accordance with an embodiment. The strut channel 202 may be a standardized formed structural system commonly used in the construction and electrical industries for light weight structural support, and often used for supporting items or components such as wiring, plumbing, mechanical devices and/or electronic devices. A basic strut channel in profile forms a box measuring about forty-one millimeters (41 mm) by forty-one millimeters or 41 mm×41 mm (1⅝ inch×1⅝ inch). Manufactures also make additional sizes that may also include combined shapes, and examples of strut channels include various products that are available from the Atkore International Company of Harvey, Illinois under the trade designations POWER-STRUT™ and UNISTRUT™, and strut channels are also available from other manufacturers such as the McMaster-Carr Company.

The strut channel 202 shown in FIG. 2 has a generally rectangular shape, and may be formed from sheet metal folded over into the open channel shape as shown, which includes inwards-curving lips that may provide additional stiffness and mounting locations. The strut channel 202 may be used to mount interconnecting components in a specific location. In particular, as shown in FIG. 2 the strut channel 202 includes holes or slots 205 in the base 204 to facilitate interconnection or fastening of the strut channel to the ceiling or other underlying building structure(s). Strut channels may be made from many different types of material(s) that are suitable for a particular purpose, for example, galvanized or painted steel, or a lightweight metal such as aluminum, or an organic polymeric resin (e.g. a molded, extruded, or pultruded thermoplastic or thermoset material). Some implementations of a strut channel may be made of an organic polymeric resin that is reinforced with inorganic fibers, such as polyester resins, vinyl esters, or epoxies which may be reinforced with fiberglass.

Referring again to FIG. 2, the mounting clip 100 is shown oriented or positioned such that a shorter side of the generally rectangular tab 114 (see FIG. 1A) of the boss 110 is aligned with an opening 214 of the strut channel 202. Thus, the boss 110 of the mounting clip 100 is configured (sized and shaped) to be fitted through the opening 214 of the strut channel for attachment thereto. The embodiment of the strut channel 202 shown in FIG. 2 includes a base 204 having through holes 205, a first side wall 206 and a second side wall 208 having a length that is shorter than the length of the base (and thus the strut channel 202 shown in FIG. 2 is generally rectangular in shape; however, it should be understood that other strut channels may include first and second side walls that are the same length as, or nearly the same length as, the base so that the strut channel is square or generally square in shape). As shown in FIG. 2, the first side wall 206 includes a first J-shaped flange 210 and the second side wall 208 includes a second J-shaped flange 212 that define the opening 214 therebetween which has a width of W' as shown. Such a strut channel is often mounted to a ceiling or suspended from a ceiling, for example in a warehouse or greenhouse, with the base 204 oriented upwards (as in FIG. 2) and with the opening 214 facing downward. In such a mounted position the long axis of the strut channel 202 extends in a generally horizontal direction along the ceiling.

As shown in FIG. 2, the J-shaped flanges 210, 212 are structures that curve interiorly and have upwardly-extending lips 216, 218 that define elongated slots 220, 222 or channels along the entire length of the strut channel 202. Embodiments of the mounting clip 100 disclosed herein may be used with such a strut channel regardless of the specific design and/or dimensions of the J-shaped flanges of the strut channel. In addition, a strut channel 202 need not have any particular elongated length as long as the boss 112 and the tab 114 that form the T-shaped structure 110 of the mounting clip 100 can fit through the opening 214 formed between the J-shaped flanges. Thus, during installation of the unitary mounting clip 100 to the strut channel 202 the tab 114 of the T-shaped mounting structure is first inserted through the elongated slot and next rotated into place, which will be explained below. Thus, a strut channel for use with a unitary mounting clip 100 shown in FIG. 2 may take the form of any suitable fixture that includes such J-shaped flanges.

Referring again to FIG. 2, the opening 214 of the strut channel 202 between the J-shaped flanges 210, 212 has a width W' whereas the interior of the strut channel 202 has a width W" that is wider than the opening 214 (wider than the width W'). In some embodiments, the strut channel 202 may be a nominal 1⅝-inch-wide strut channel, which measurement refers to the overall external width of the strut channel and may have an interior width W" of 1.41 inch. The strut channel may also have a vertical height V of 1⅝ inch (or another measurement, such as 1⅜ inch). In some implementations, the opening 214 between the J-shaped flanges has an opening width W' of 0.81 inches. In addition, the base 204 and/or sidewalls of the strut channel 202 may be a of continuous length, for example of two feet or four feet in length, or may be periodically interrupted by holes, slots, knockouts, and so on, as desired. As mentioned earlier, strut channels are available in many different configurations, shapes and sizes, and thus it will be appreciated that implementations of the mounting clip 100 and its' features (such as the boss 110) will be sized accordingly for compatibility of use with any particular strut channel.

Figure 3A:
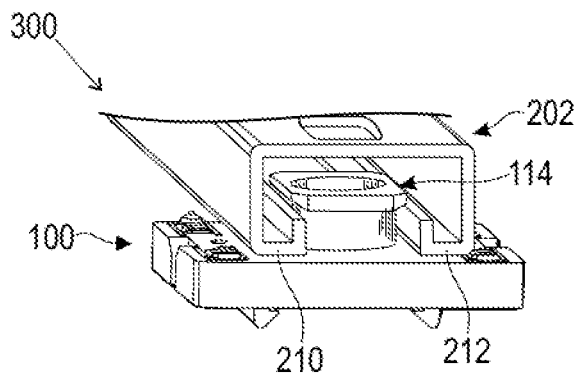
FIG. 3A is a perspective side view of strut channel and a mounting clip illustrating an initial mounting position and/or first step of mounting the mounting clip to the strut channel in accordance with some embodiments of the disclosure.

FIG. 3A is a perspective side view 300 of strut channel 202 and mounting clip 100 of FIG. 2 shown in an initial mounting position and/or first step of mounting the unitary mounting clip 100 to the strut channel 202 in accordance with some embodiments. In particular, the longer length of the tab 114 has been aligned with the longitudinal axis of the elongated slot of the strut channel 202 so that the tab 114 and the boss 112 of the T-shaped structure 110 have been fully inserted through the opening 214 (see FIG. 2) of the strut channel 202 such that the tab 114 is above the upwardly-extending lips 216, 218 of the J-shaped flanges 210, 212. Thus, when the unitary mounting clip 100 is next rotated by an installer (as explained below) the extended wing portions of the tab 114 will be seated on the top surfaces of the he upwardly-extending lips 216, 218.

Figure 3B:
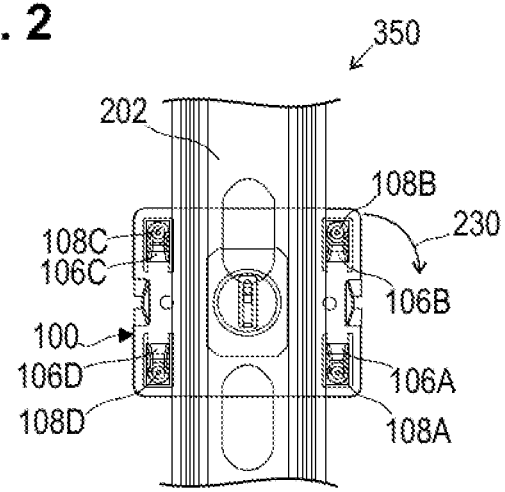
FIG. 3B is a top view of the strut channel and the mounting clip of FIG. 3A for illustrating certain features of the mounting clip in accordance with some embodiments of the disclosure.

FIG. 3B is a top view 350 of the same strut channel 202 in phantom and the unitary mounting clip 100 of FIG. 3A. As shown in FIG. 3B, the elastic arms 106A-106D, which include the raised dimple structures 108A-108D, are physically positioned outside the area of the J-shaped flanges 210, 212. The arrow 230 illustrates a direction of rotation that an installer could use to rotate the mounting clip 100 a quarter-turn or ninety degrees (90°) to engage the elastic arms 106A-106D having the raised dimple structures 108A-108D with the bottom surfaces of the J-shaped flanges 210, 212 of the strut channel 202, which will be explained in more detail below. This also serves to create pressure on the J-shaped flanges 210, 212 between the tab 114 and the elastic arms 106A-106D of the unitary mounting clip. In some embodiments, when the installer turns the mounting clip 100 the elastic arms 106A-106D and associated raised dimple structures 108A-108D emit an audible "snap" or "click" sound as these features engage with the top and bottom surfaces of the J-shaped structures 220, 212 of the strut channel.

Figure 4A:
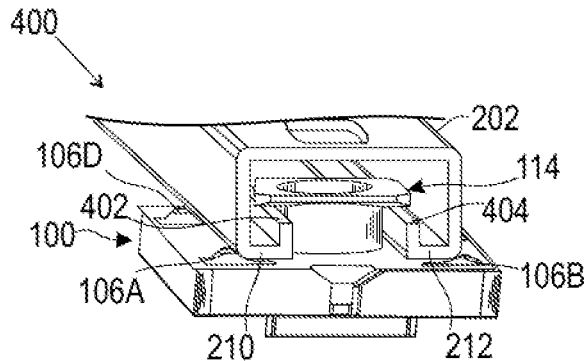
FIGS. 4A and 4B illustrate a perspective side view and a top view, respectively, of the strut channel and mounting clip of FIGS. 3A and 3B of the mounting clip in a mounted position after a ninety-degree (90°) rotation of the mounting clip in accordance with some embodiments of the disclosure.

FIG. 4A is a perspective side view 400 of the strut channel 202 and mounting clip 100 of FIGS. 2 to 3B wherein the mounting clip 100 has been turned ninety-degrees (90°) by an installer in accordance with some embodiments. In particular, the T-shaped structure 110 of the mounting clip 100 has been inserted through the opening 214 (see FIG. 2) in the strut channel 202 and the entire mounting clip 100 has been turned 90° so that the mounting clip 100 is in a mounted position. Specifically, bottom wing portions of the generally rectangular tab 114 contact the top surfaces 402 and 404 of the upwardly extending lips 216, 218 of the J-shaped flanges 210, 212 within the strut channel 202. In addition, the elastic arms 106A-106D of the mounting clip 100 are now biased towards, and the dimples 108A-108D are contacting, the downward facing surfaces of the J-shaped flanges 210, 212 of the strut channel 202. Moreover, as shown an inner edge of each of the raised dimple structures 108A-108D contacts a bottom outside wall portion of the strut channel 202 which serves to align the mounting clip 100 in place along the length of the strut channel. Thus, a friction force or pressure is being exerted which holds or locks the unitary mounting clip 100 in place at a particular location along the length of the strut channel 202.

Figure 4B:
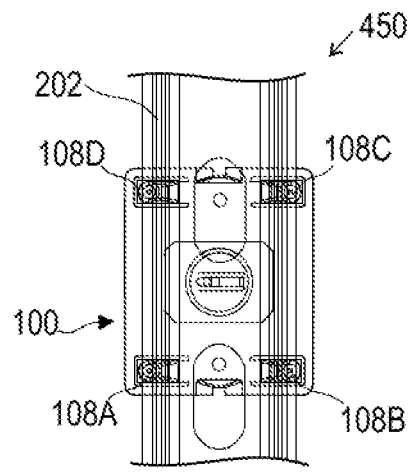

FIG. 4B is a top view 450 of the unitary mounting clip 100 of FIG. 4A connected to the strut channel 202 which shows that an inside portion of each or the raised dimple structures 108A-108D is engaged with a lower portion of the outside walls of the strut channel 202, whereas the elastic arms 106A-106D contact and apply a friction force to the bottom facing surface of the J-shaped flanges 210, 212. Such engagement effectively locks the unitary mounting clip 100 to the strut channel 202 at the current position unless sufficient force is applied by an installer to overcome the friction force and slide or move the mounting clip 100 to another position (repositioning) along the length of the strut channel 202.

Figure 5:
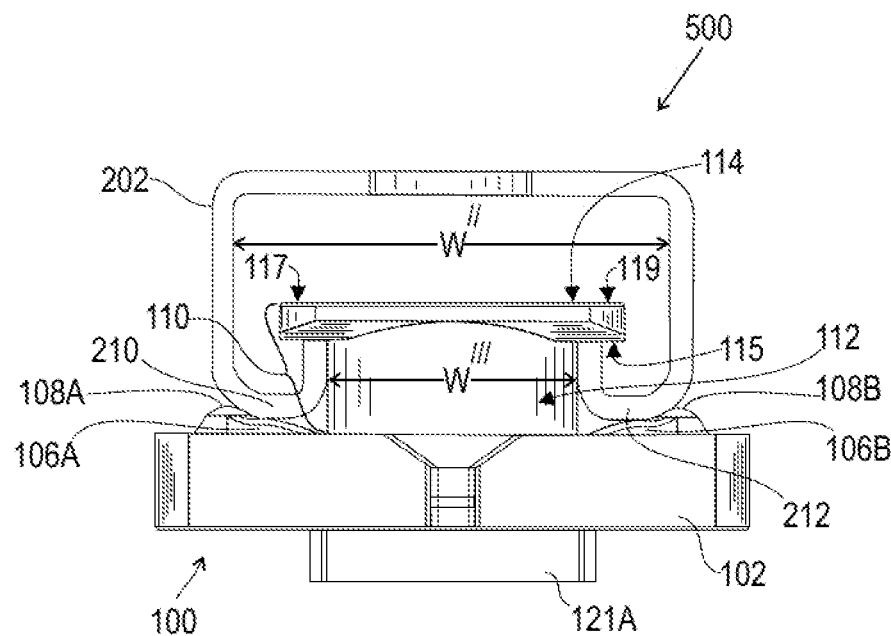
FIG. 5 is an enlarged side view of a mounting clip affixed to a strut channel according to some embodiments of the disclosure.

FIG. 5 is an enlarged side view 500 of a unitary mounting clip 100 installed or affixed to a strut channel 202 according to embodiments described herein. As shown, the unitary mounting clip 100 has already been rotated 90° such that bottom portions of the wings 117, 119 of the rectangular tab 114 contact the top surfaces of the upwardly extending lips of the J-shaped flanges 210, 212. In addition, the elastic arms 106A and 106B are biased against a lower wall portion of the J-shaped flanges 210, 212 whereas inner wall portions of the raised dimples 108A and 108B are engaged with the outside bottom walls of the J-shaped flanges 220, 212. Also in this embodiment, as shown in FIG. 5, the T-shaped structure 110 includes a generally circular boss having a width W'" that is substantially the same as the opening 214 (see FIG. 2) between the J-shaped flanges of the channel strut 202.

In some embodiments, when the mounting clip 100 is installed on the strut channel 202 as shown in FIGS. 4A, 4B and 5, the elastic arms 106A-106D are designed to apply pressure amounting to about one to two pounds of force to effectively lock the mounting clip in place to the strut channel. However, this friction force can be overcome by a person or installer to reposition the mounting clip by sliding it along the length of the channel strut if desired or required. In addition, an installer may remove the mounting clip from the strut channel by using approximately the same amount of force to initially rotate the mounting clip ninety degrees (90°) so that the bottom portion of the wing portions 117, 119 of the generally rectangular tab 114 are removed from contacting the top surfaces 402 and 404 of the upwardly extending lips 216, 218 of the J-shaped flanges 210, 212. This also removes the friction forces applied by the elastic arms 106A-106D to the top surfaces 402 and 404 of the upwardly extending lips 216, 218 of the J-shaped flanges 210, 212, and aligns the long edges of the rectangular tab 114 with the opening 214 of the strut channel 202 so that the mounting clip 100 can be pulled downward and removed from the elongated slot of the strut channel 202. The installer can then reposition the mounting clip on that strut channel or attach it to a different strut channel.

Figure 6A:
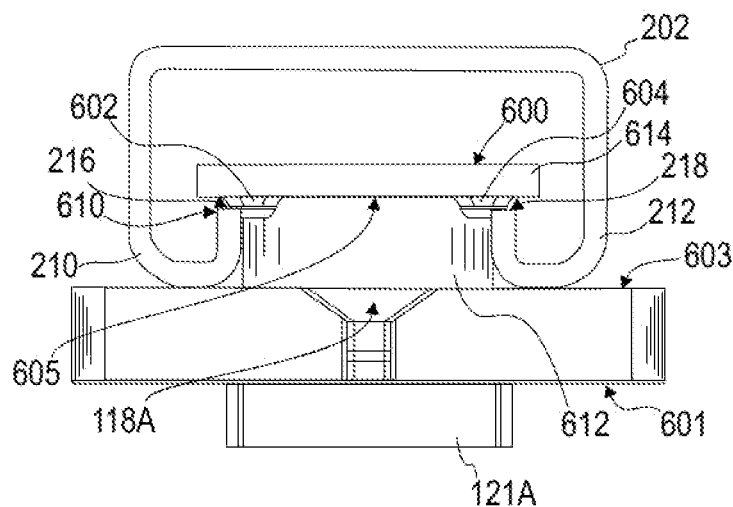
FIG. 6A is an enlarged side view of another embodiment of a unitary mounting clip installed onto a strut channel in accordance with embodiments of the disclosure.

FIG. 6A is an enlarged side view of another embodiment of a unitary mounting clip 600 installed or affixed to a strut channel 202 in accordance with embodiments described herein. The unitary mounting clip 600 includes a generally rectangular base 601 having a top base surface 603 and a J-shaped structure 610 that comprises a generally rectangular tab on a distal end of a boss 612 that extends upwardly from the top base surface 603. In embodiments, the unitary mounting clip 600 may be a one-piece unit made of, for example, a polycarbonate material, a fiberglass material, plastic, metal and/or a composite material, any and all of which have sufficient strength to support an object to be connected thereto, such as an LED luminaire. As with the mounting clip 100, the unitary mounting clip 600 may be manufactured using an injection molding process wherein a heated, liquid plastic is injected via a nozzle into a mold that includes the features of the mounting clip disclosed herein.

Figure 6B:
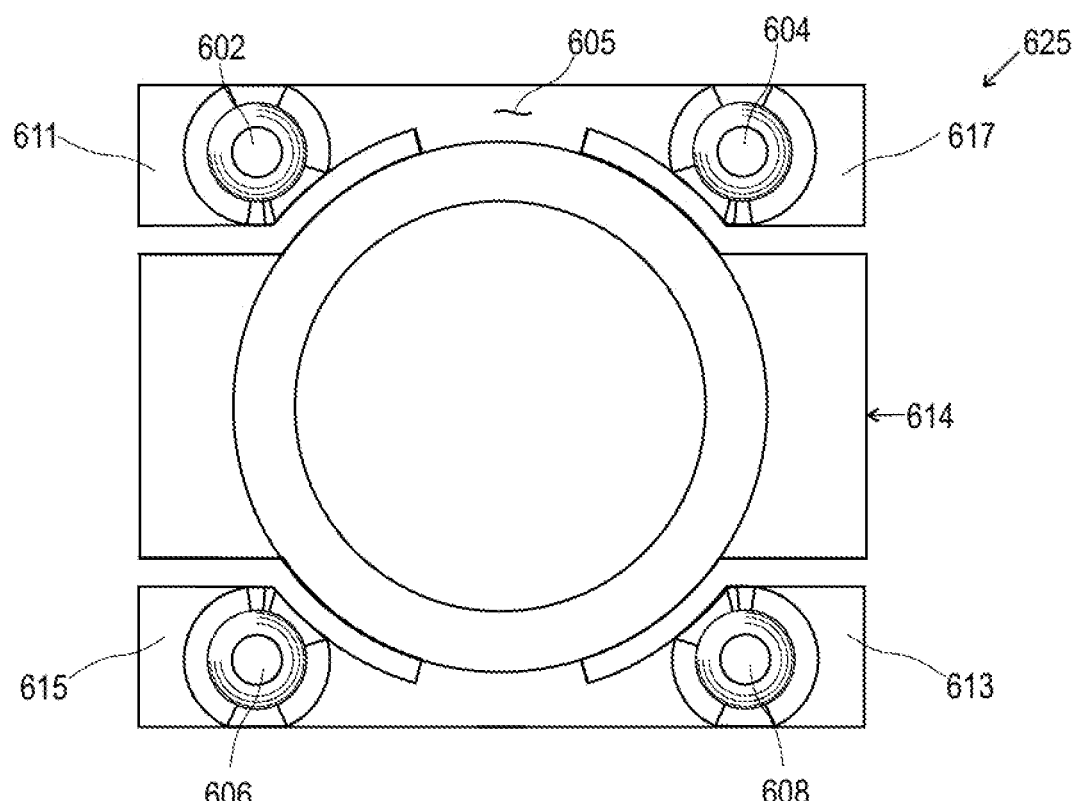
FIG. 6B is a cutaway bottom view of the tab shown in FIG. 6A to illustrate the four elastic arms according to some embodiments of the disclosure.

FIG. 6B is a cutaway bottom view 625 of the tab 614 of FIG. 6A to illustrate the four elastic arms 611, 613, 615 and 617 according to an embodiment. As shown, each of the elastic arms 611-617 is located near the corners or outside edges of the generally rectangular tab 614 and each elastic arm includes a respective downwardly facing friction feature or dimple 602, 604, 606 and 608. The friction features 602-608 function in the same manner as the friction features 108A-108D described above with respect to unitary mounting clip 100. Thus, the elastic arms 611-617 may be thought of as flex levers, and in the embodiment of FIG. 6B their associated raised dimple structures 602-608 project downwardly from the bottom surface 605 of the tab 614, as shown. During installation of the unitary mounting clip 600, the elastic arms 611-617 (flex levers) bias the raised dimple structures 602-608 to contact the upwardly extending lips 216, 218 of the J-shaped flanges 210, 212 of the strut channel 202 (see FIG. 6A) and thus apply pressure and/or a friction force which holds the mounting clip 600 in place between the top and bottom portions of the J-shaped flanges.

Figure 6C:
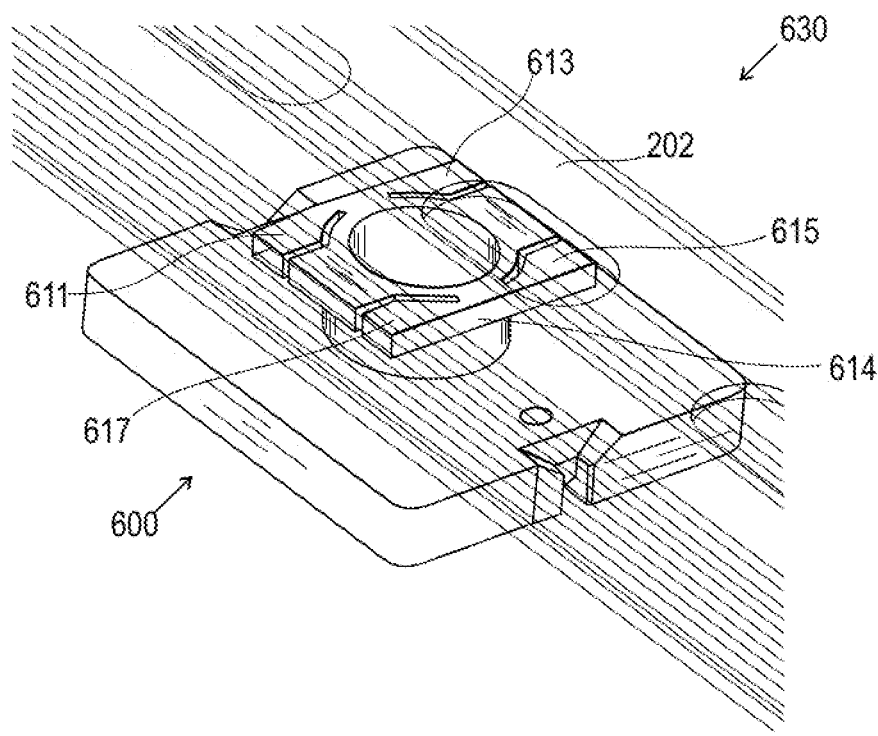
FIG. 6C is a top and side perspective view of the unitary mounting clip of FIGS. 6A and 6B and a strut channel shown in phantom so as to depict installation in accordance with an embodiment of the disclosure.

FIG. 6C is a top and side perspective view 630 of the unitary mounting clip 600 attached to a strut channel 202 which is shown in phantom so as to depict the installation in accordance with an embodiment. In FIG. 6C, the unitary mounting clip 600 has been rotated 90° by an installer such that the dimples (not shown) of the elastic arms 611, 613, 615 and 617 of the rectangular tab 614 contact the top surfaces of the upwardly extending lips of the J-shaped flanges (not shown). The elastic arms 611-617 and associated dimples apply a bias or pressure to the upper wall portion of the J-shaped flanges to draw a portion of the top base surface 603 of the unitary mounting clip 600 to contact a bottom wall portion of the J-shaped flanges which effectively locks the unitary mounting clip 600 in place in between the upper wall portion and the lower wall portion of the J-shaped flanges.

Figure 7A:
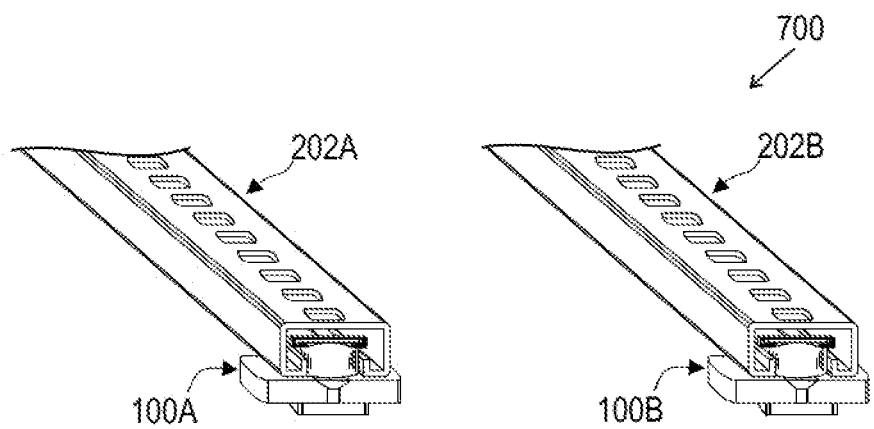
FIG. 7A is a top perspective view of two mounting clips that each has been affixed to one of two adjacent strut channels in accordance with some embodiments of the disclosure.

FIG. 7A is a top perspective view 700 of two mounting clips 100A and 100B that have been affixed or attached to two strut channels 202A and 202B by an installer rotating each of the unitary mounting clips by a quarter-turn into position, respectively, in accordance with embodiments disclosed herein. These two mounting clips 100A, 100B have been positioned or aligned such that an object or component, such as an LED batten, may be suspended therebetween at a desired location or may be positioned at a particular spot along the lengths of the strut channels 202A, 202B.

Figure 7B:
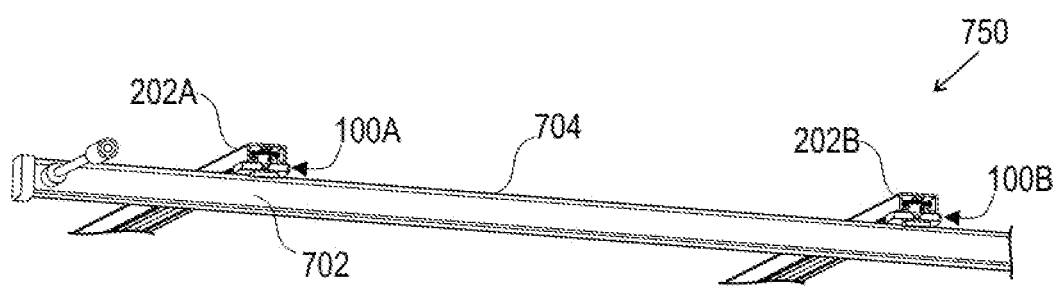
FIG. 7B is a bottom perspective view of the two strut channels and the mounting clips of FIG. 7A now affixed to an LED luminaire in accordance with some embodiments of the disclosure.

FIG. 7B is a bottom perspective view 750 of the two mounting clips 100A and 100B of FIG. 7A affixed to the two strut channels 202A and 202B and now also including an LED luminaire 702 connected thereto. Specifically, a rim portion 704 of the LED luminaire has been snapped into place between the first and second snap holders 121A, 121B (which rim portion is shown in FIG. 8B) of both mounting clip 100A and mounting clip 100B. If an installer wishes to move the location of the LED luminaire 702 to another position between the strut channels 202A, 202B then he or she may first remove the LED luminaire from each unitary mounting clip by rotating it to disengage from the snap holders 121A, 121B, and then the installer may use a force sufficient overcome the friction force(s) that are holding the unitary mounting clips 100A and/or 100B in place to push and/or slide one or both of them to another desired location along the length of the strut channels 202A and 202B.

Figure 8A:
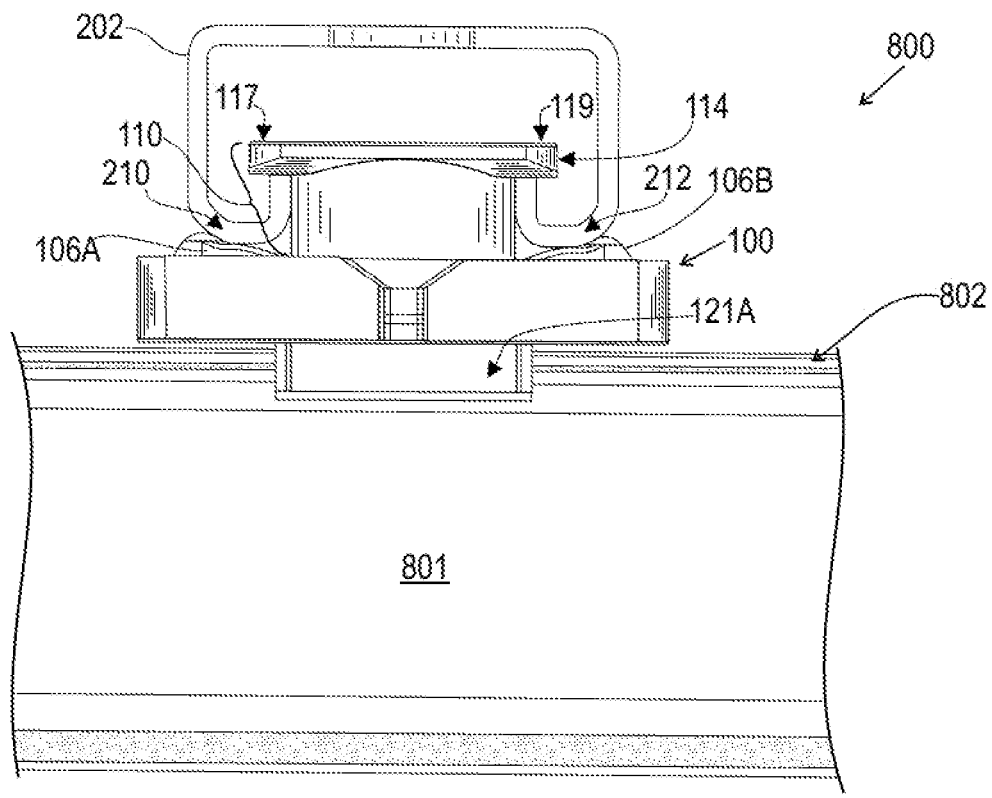
FIG. 8A is an enlarged side view of the mounting clip shown in FIG. 5 affixed to a strut channel and to an LED luminaire in accordance with some embodiments of the disclosure.
Figure 8B:
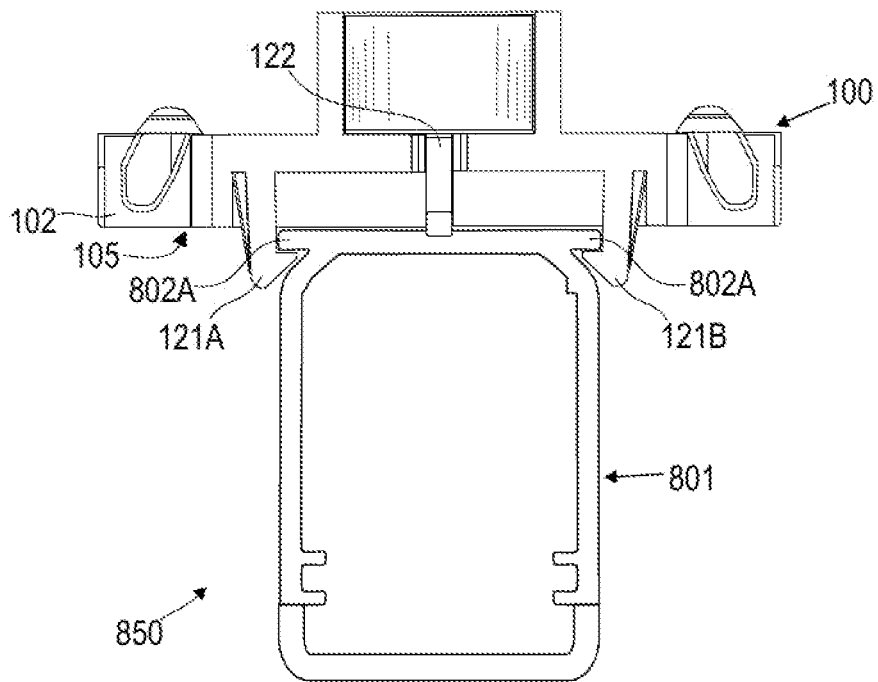
FIG. 8B is a simplified cross-sectional side view of a lower portion of the unitary mounting clip and LED luminaire of FIG. 8B in accordance with some embodiments of the disclosure.

FIG. 8A is an enlarged side view 800 of the mounting clip 100 shown in FIG. 5 now affixed to a strut channel 202 and to an LED luminaire 801 in accordance with some embodiments. As shown, the mounting clip 100 has been rotated 90° such that bottom portions of the wings 117, 119 of the tab 114 (of the T-shaped structure 110) are contacting the top surfaces of the upwardly extending lips of the J-shaped flanges 210, 212 as discussed above. In addition, the elastic arms 106A and 106B are biased against or applying pressure to the lower wall portions of the J-shaped flanges 210, 212, and as shown the inner wall portions of the raised dimples 108A and 108B are engaged with the outside bottom walls of the J-shaped flanges. Also shown in FIG. 8 is the first snap holder 121 engaged with a rim portion 802 of the LED luminaire 801.

FIG. 8B is a simplified cross-sectional side view 850 of a lower portion of the unitary mounting clip 100 and LED luminaire 801 of FIG. 8B to illustrate connection to the snap holder that includes the first snap holder portion 121A and second snap holder portion 121B which extend downwards from the bottom base surface 105 of the base 102 of the unitary mounting clip. As shown, the snap holder portions 121A, 121B capture the first rim portion 802A and second rim portion 802B of the LED luminaire 801 when the installer snaps the LED luminaire into the unitary mounting clip 100 which is already installed on the strut channel 202 (shown in FIG. 8A).

Figure 9A:
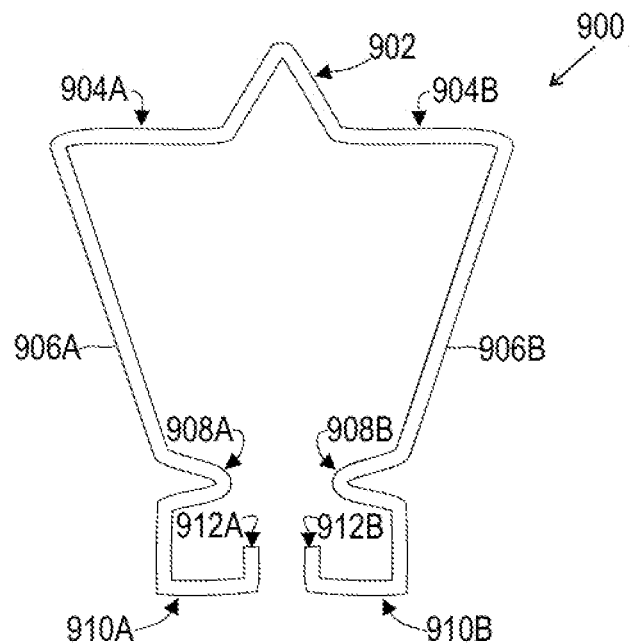
FIG. 9A illustrates a wire mount unit according to some embodiments of the disclosure.

FIG. 9A illustrates a wire mount unit according to some embodiments. The wire mount unit 900 includes a central notch portion 902, a first side shoulder 904A, a second side shoulder 904B, a first side portion 906A, a second side portion 906B, first and second inwardly facing notch portions 908A, 908B, and generally J-shaped engagement portions 910A, 910B which terminate with connecting pins 912A, 912B. Such a wire mount unit 900 is sized and shaped to attach to a mounting clip 100 in accordance with embodiments disclosed herein and may be made of a lightweight metal or composite material which permits some flexing between the first and second side portions 906A, 906B to permit attachment to a mounting clip.

Figure 9B:
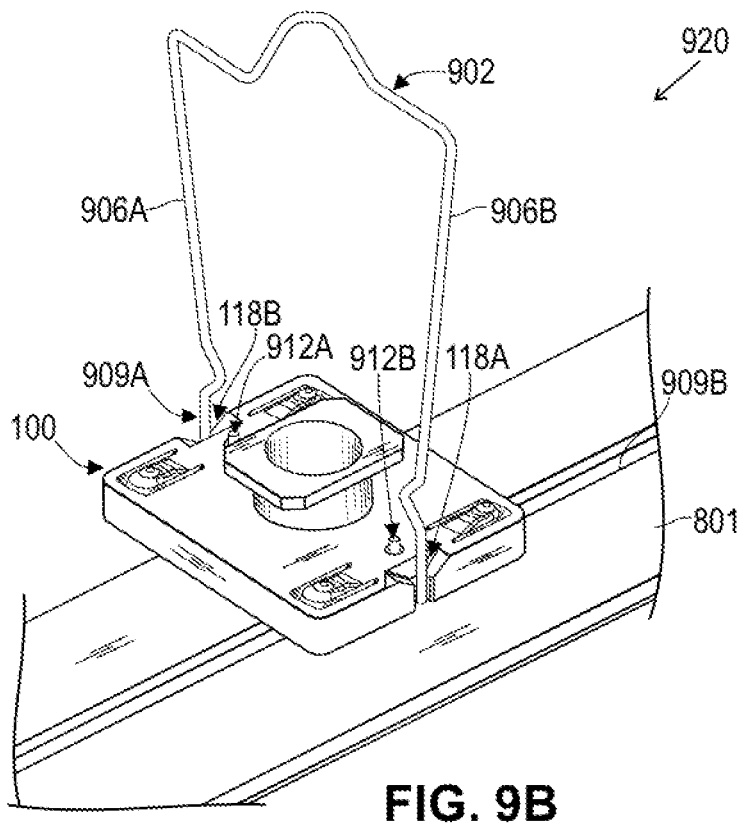
FIG. 9B is a top perspective view of the wire mount unit of FIG. 9A in accordance with some embodiments of the disclosure.

FIG. 9B is a top perspective view 920 of the wire mount unit 900 of FIG. 9A which an installer has connected to a unitary mounting clip 100 in accordance with some embodiments. Specifically, the J-shaped engagement portions 910A, 910B (see FIG. 9A) have been inserted into the wire channels 118A, 118B of the unitary mounting clip 100 such that the connecting pins 912A, 912B have been seated in the first and second wire mount unit receptacles 120A, 120B (see FIG. 1A). An LED luminaire 801 is also shown connected to a snap holder (not shown) underneath the unitary counting clip 100. Accordingly, such a wire mount unit 900 permits a vast amount of flexibility for using the unitary mounting clip 100 and LED luminaire 801 (or other object) to be affixed to and/or or hung from a variety of fixtures or building materials, such as ropes, chains, pipes, strut channels, wires, cables, beams and the like in various configurations as will be illustrated by FIGS. 10-12 below.

Figure 10:
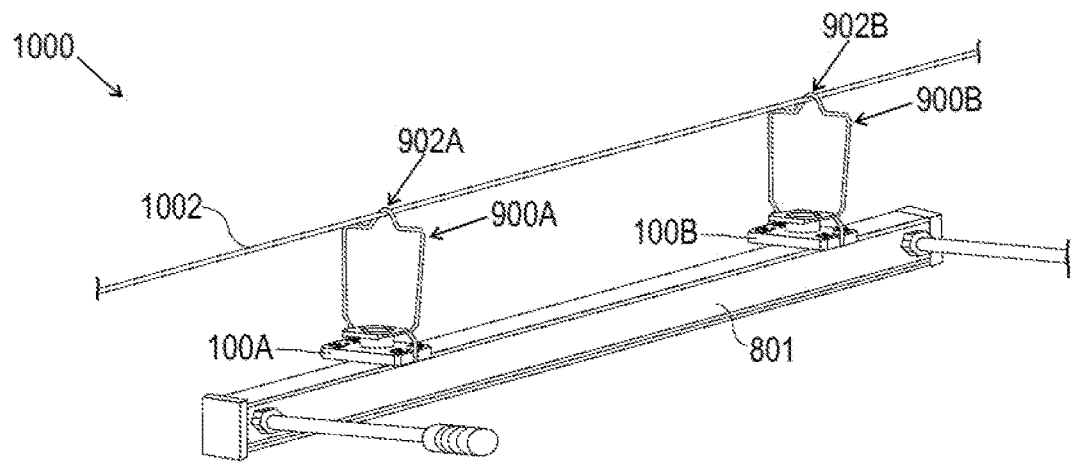
FIG. 10 illustrates a suspension layout utilizing two wire mount units of the type shown in FIG. 9 and two mounting clips of the type shown in FIGS. 1A and 1B to mount or suspend an LED luminaire to a wire in accordance with some embodiments of the disclosure.

FIG. 10 illustrates a suspension layout 1000 utilizing two wire mount units of the type shown in FIG. 9 and two mounting clips of the type shown in FIGS. 1A and 1B to mount or suspend an LED luminaire 801 to/from a wire 1002 in accordance with some embodiments. As shown, an LED luminaire 801 has been connected to a first mounting clip 100A and a second mounting clip 100B which in turn have been connected to a first wire mount unit 900A and a second mounting clip 900B. The first and second wire mount units 900A and 900B were first suspended via their central notch portions 902A, 902B to a wire 1002, which in turn may be connected, for example, between walls of a warehouse or other building near the ceiling of a room. To change the position of the LED luminaire 801 along the length of the wire 1002 an installer would merely slide the LED luminaire and affixed first and second mounting clips 100A, 100B and first and second wire mount units 900A, 900B along the length of the wire 1002 to the desired location.

Referring again to FIG. 9, when utilized the wire mount unit 900 an installer first hangs it from a structure such as the wire 1002 shown in FIG. 10 and then attaches the mounting clip 100 thereto. Specifically, after hanging the wire mount unit from the wire 1002 the installer pulls the first side portion 906A and the second side portion 906B away from each other so that the J-shaped engagement portions 910A, 910B can be fitted through the wire channels 118A, 118B (See FIGS. 1A and 1B) of the mounting clip 100. In addition, the installer aligns and inserts the connecting pins 912A, 912B into the wire mount unit receptacles 120A, 120B (See FIGS. 1A and 1B) found in the top base surface 104 of the mounting clip 100.

Figure 11:
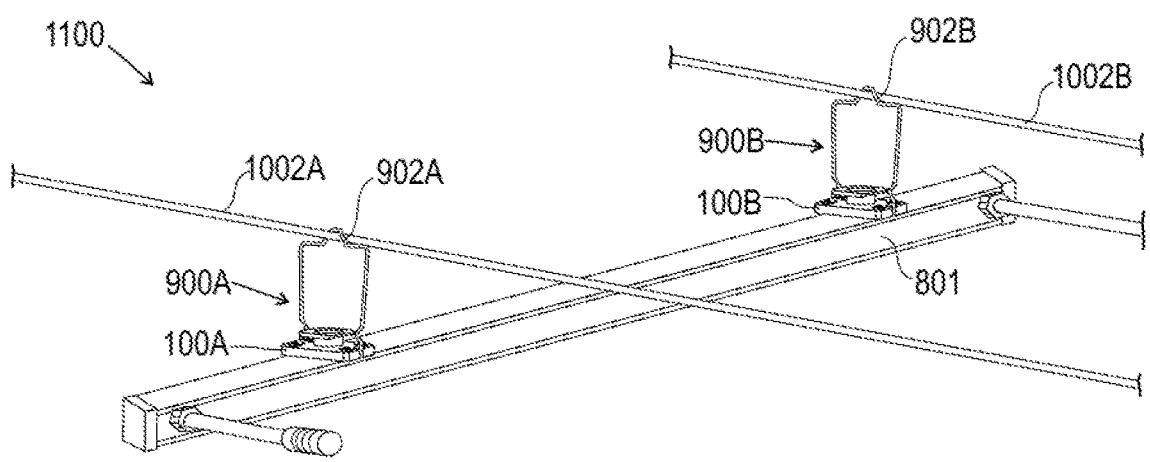
FIG. 11 shows an alternate suspension layout using two wire mount units of the type shown in FIG. 9 and two mounting clips of the type shown in FIGS. 1A and 1B to mount or suspend an LED luminaire to two wires in accordance with some embodiments of the disclosure.

FIG. 11 shows an alternate suspension layout 1100 using two wire mount units of the type shown in FIG. 9 and two mounting clips of the type shown in FIGS. 1A and 1B to mount or suspend an LED luminaire to/from two wires in accordance with some embodiments. In this embodiment, an LED luminaire 801 has been suspended at a first end portion via the first mounting clip 100A and the first wire mount unit 900A to a first wire 1002A, and suspended at a second end portion via the second mounting clip 100B and the second wire mount unit 900B to a second wire 1002B. In this implementation, if an installer wishes to change the position of the LED luminaire 801 between the length of the wires 1002A, 1002B then the installer would merely slide the LED luminaire 801 along the lengths of the wires to the desired location.

Figure 12:
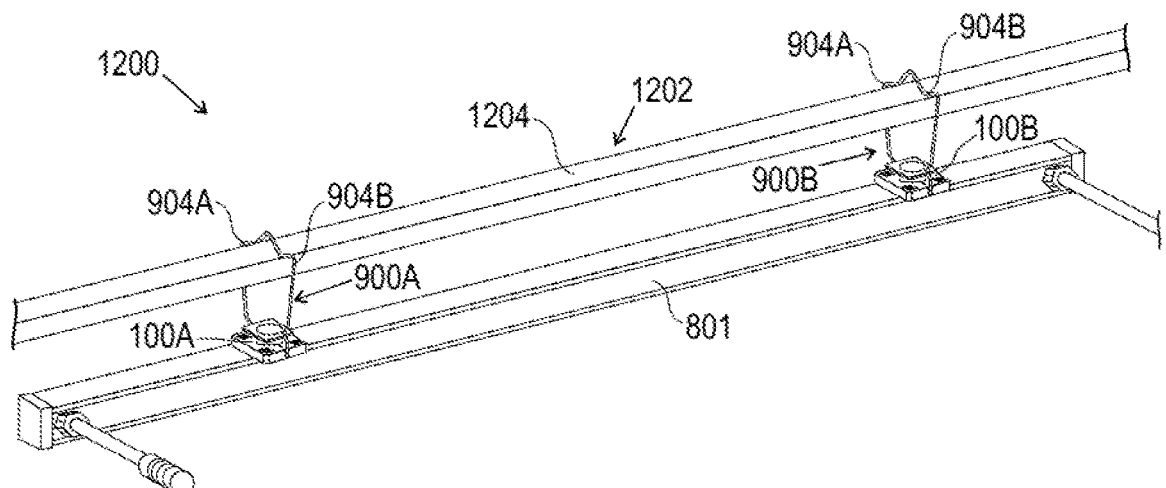
FIG. 12 shows another alternate suspension layout using two wire mount units of the type shown in FIG. 9 and two mounting clips of the type shown in FIGS. 1A and 1B to mount or suspend an LED luminaire to a strut channel in accordance with some embodiments of the disclosure.

FIG. 12 shows another alternate suspension layout 1200 using two wire mount units of the type shown in FIG. 9 and two mounting clips of the type shown in FIGS. 1A and 1B to mount or suspend an LED luminaire 801 to a strut channel 1202 in accordance with some embodiments. In this embodiment, an LED luminaire 801 has been suspended at a first end portion via the first mounting clip 100A and the first wire mount unit 900A to a strut channel 1202 and is suspended at a second end portion via the second mounting clip 100B and the second wire mount unit 900B to the same strut channel. Specifically, a first side shoulder 904A and second side shoulder 904B of the first wire mount unit 900A and a first side shoulder 904C and second side shoulder 904D of the second wire mount unit 900B contact the base portion 1204 of the strut channel 1202 which has been suspended, for example, between two wall portions of a room via end contact points (not shown). This, in this implementation, if an installer wishes to change the position of the LED luminaire 801 along the length of the strut channel 1202 then the installer could merely slide the LED luminaire 801 along the length of the strut channel 1202 to the desired location.

Thus, then disclosed mounting clip solves the technical problem of how to provide a mounting clip that is inexpensive to manufacture and that facilitates the quick installation and/or positioning and/or re-positioning and/or replacement of a component, such as an LED luminaire, from a mounting component such as a strut channel. Embodiments of the mounting clip disclosed herein achieve these goals by being of a unitary design which is not only inexpensive to manufacture, but also provides integrated mounting features which do not require the use of any additional fasteners to affix devices, such as LED luminaires, to a mounting component such as a strut channel or wire. In particular, since installers need only insert the mounting clip into a channel of a strut channel and twist the mounting clip ninety degrees to affix it thereto, the speed and ease of installation of components such as LED luminaires is greatly improved which results in lower installation costs. In addition, embodiments of mounting clips disclosed herein also permit the use of wire mount units for the quick and easy connection to wires which may be, for example, strung between walls of a room near the ceiling.

It should be understood that, although installation methods for an embodiment of the unitary mounting clip 100 have been described herein with regard to installing and/or affixing an LED luminaire to a strut assembly or mounting wire, embodiments of the unitary mounting clip are contemplated that could be used for connection to other types of mounting apparatus. In addition, different embodiments of the unitary mounting clip are contemplated that could be modified for attachment to other types of devices or objects that could then be mounted to a strut channel or hung from a wire, or wires, or other elongated structures. For example, a unitary mounting clip of the type disclosed herein, or a modification thereof, could be utilized to hang or suspend plant growing trays, temperature sensors or other types of sensors, video cameras and/or still cameras, fans and/or blowers, ducts, water pipes, sprinklers, transportation rails, pots, gutters, cables, and other types of objects, equipment, components and/or devices from a strut channel or strut channels, or from other types of elongated structures, or from one or more wires.

The above descriptions and/or the accompanying drawings are not meant to imply a fixed order or fixed sequence of steps for any method of connection and/or process or method of manufacture referred to herein. Thus, any disclosed process may be performed in any order that is practicable, including but not limited to simultaneous performance of one or more steps that are indicated as sequential.

Although the present invention has been described in connection with specific exemplary embodiments, various changes, substitutions, modifications and/or alterations apparent to those skilled in the art can be made to the disclosed mounting clip and/or wire mount unit without departing from the spirit and scope of the invention as set forth in the appended claims.

What is claimed is:

1. A unitary mounting clip for mounting equipment to a building structure comprising:
   a base;
   a mounting structure extending upwardly from a top surface of the base, the mounting structure comprising a boss and a distal mounting tab;
   at least one elastic arm having a friction feature, wherein the at least one elastic arm is laterally offset on the top surface of the base a distance from the mounting structure and is adapted to move relative to the top surface of the base; and
   a snap holder extending from a bottom surface of the base,
   wherein, when the boss and distal mounting tab are inserted through an opening of the building structure and the unitary mounting clip is rotated ninety degrees, the friction feature of the at least one elastic arm is biased to contact a portion of the building structure and lock the unitary mounting clip in place.

2. The unitary mounting clip of claim 1, wherein the base of the unitary mounting clip has a generally rectangular shape.

3. The unitary mounting clip of claim 1, wherein the friction feature comprises a raised dimple structure located on the at least one elastic arm.

4. The unitary mounting clip of claim 1, wherein the boss has a generally circular shape and the distal mounting tab has generally rectangular shape such that the mounting structure has a is generally T-shaped profile.

5. The unitary mounting clip of claim 4, wherein the building structure comprises a length and an elongated slot and wherein the unitary mounting clip is installed by:
   aligning a long side of the distal mounting tab with a longitudinal axis of the elongated slot of the building structure;
   inserting the distal mounting tab through the elongated slot to a desired location along the length of the building structure; and
   rotating the unitary mounting clip ninety degrees to engage the friction feature into contact with a wall portion of the building structure.

6. The unitary mounting clip of claim 1, further comprising at least one wire channel provided through the base of the unitary mounting clip and configured for attachment to a wire mount.

7. The unitary mounting clip of claim 6, further comprising at least on wire mount receptacle formed in the base adjacent the at least one wire channel.

8. The unitary mounting clip of claim 1, wherein the elastic arm is a flex lever that is adapted to flex relative to the top surface of the base when the unitary mounting clip is rotated ninety degrees.

9. A method for affixing a unitary mounting clip to a building structure having a length so that an object can then be to attached to the unitary mounting clip, the method comprising:
   aligning a long side of a generally rectangular tab located on a distal end of a boss extending upwardly from a top surface of a base of a unitary mounting clip with a longitudinal axis of an elongated slot of a building structure;
   inserting the generally rectangular tab through the elongated slot to a desired location along the length of the building structure; and
   rotating the unitary mounting clip ninety degrees to engage a friction feature into contact with a wall portion of the building structure,
   wherein the friction feature is provided on an elastic arm that is movable relative to the top surface of the base.

10. The method of claim 9, wherein the friction feature is located on the top surface of the base laterally offset from the boss, and when the unitary mounting clip is rotated ninety degrees the friction feature engages with a bottom wall portion of the building structure.

11. The method of claim 9, wherein the friction feature is located on a bottom surface of the generally rectangular tab above the base, and when the unitary mounting clip is rotated ninety degrees the friction feature engages with a top wall portion of the building structure.

12. The method of claim 9, wherein the unitary mounting clip further comprises a snap holder located on a bottom surface of the base of the unitary mounting clip, and wherein the method further comprises attaching the object to the snap holder.

13. The method of claim 9, wherein the building structure comprises a strut channel.

14. The method of claim 13, wherein a bottom wall portion of the building structure comprises a top wall portion of a J-shaped flange of the strut channel and a top wall portion comprises a bottom wall portion of the J-shaped flange.

15. The method of claim 9, wherein the elastic arm is a flex lever that flexes relative to the top surface of the base when the unitary mounting clip is rotated ninety degrees.

16. A unitary mounting clip for mounting equipment to a building structure comprising:
   a base;
   a mounting structure extending upwardly from a top surface of the base, the mounting structure comprising a boss and a distal mounting tab;
   at least one elastic arm provided on the distal mounting tab and adapted to move relative to the distal mounting tab;
   a friction feature provided on the at least one elastic arm so as to be exposed on a bottom surface of the distal mounting tab; and
   a snap holder extending from a bottom surface of the base,
   wherein, when the boss and distal mounting tab are inserted through an opening of the building structure and the unitary mounting clip is rotated ninety degrees, the friction feature of the at least one elastic arm is biased to contact a portion of the building structure and lock the unitary mounting clip in place.

17. The unitary mounting clip of claim 16, wherein the at least one elastic arm is a flex lever adapted to flex relative to the distal mounting tab when the unitary mounting clip is rotated ninety degrees.

18. The unitary mounting clip of claim 16, wherein the friction feature comprises a raised dimple structure located on the at least one elastic arm.

\* \* \* \* \*